United States Patent [19]
Karabinis

[11] Patent Number: 6,052,560
[45] Date of Patent: Apr. 18, 2000

[54] SATELLITE SYSTEM UTILIZING A PLURALITY OF AIR INTERFACE STANDARDS AND METHOD EMPLOYING SAME

[75] Inventor: Peter D. Karabinis, Cary, N.C.

[73] Assignee: Ericsson Inc, Research Triangle Park, N.C.

[21] Appl. No.: 08/951,133

[22] Filed: Oct. 15, 1997

[51] Int. Cl.[7] .................................................. H04B 7/185
[52] U.S. Cl. .......................... 455/12.1; 455/428; 455/553
[58] Field of Search .................................. 455/12.1, 426, 455/428, 427, 552, 553

[56] References Cited

U.S. PATENT DOCUMENTS

| | | | |
|---|---|---|---|
| 5,490,284 | 2/1996 | Itoh et al. | 455/427 |
| 5,535,430 | 7/1996 | Aoki et al. | 455/552 |
| 5,535,432 | 7/1996 | Dent | 455/552 |
| 5,539,730 | 7/1996 | Dent | 370/29 |
| 5,586,165 | 12/1996 | Wiedman | 455/427 |
| 5,664,006 | 9/1997 | Monte et al. | 455/427 |
| 5,832,379 | 11/1998 | Mallinckrodt | 455/427 |

FOREIGN PATENT DOCUMENTS

WO 96/34503  4/1996  WIPO .

OTHER PUBLICATIONS

Chitrapu & Reilly, Development of a GSM–derived Regional Mobile Satellite Communication System, 1997 IEEE, pp. 1–11.

Tafazolli & Evans, Call Processing Functions in the Integrated Satellite and GSM System, Apr. 28, 1996, IEEE, pp. 507–511.

Giancristofaro, Zhang & Sheriff, Active User Management for the Combined Satellite and Terrestrial Cellular Components of the UMTS, May 13–15, 1996, Satellite Systems for Mobile Communications and Navigation, Con. Pub. No. 424, pp. 133–138.

Priscoli & Muratore, Study of the Integration Between the GSM Cellular Network and a Satellite System, 1993, IEEE, pp. 588–592.

Horobin, Facing the Challenge of Developing Test Solutions for Dual Mode, Satellite and Terrestrial Mobile Systems.

P. Chitrapu & T. Reilly, Development of a GSM–derived Regional Mobile Satellite Communication System, The Institution of Electrical Engineers, IEE, 1997, pp. 1–11.

X.H.R. Tafazolli & Prof. B.G. Evans, Call Processing Functions in the Integrated Satellite and GSM System, IEEE, Apr. 28, 1996, pp. 507–511.

D. Giancristofaro, L.S. Zang & R.E. Sheriff, Active User Management for the Combined Satellite and Terrestrial Cellular Components of the UMTS, Conference Publication No. 424, IEE, 1996.

*Primary Examiner*—Paul Loomis
*Attorney, Agent, or Firm*—Jenkens & Gilchrist

[57] ABSTRACT

A satellite system and method for facilitating communications of mobile terminal users operating in a satellite-based communications mode. In particular, the present invention is directed to a satellite system employing at least one satellite air interface standard modeled after at least one terrestrially-based, cellular air interface standard, forming a satellite/cellular mode pair such as ACeS/GSM. One or more of such pairs are utilized for communications within the satellite system.

62 Claims, 3 Drawing Sheets

SATELLITE SYSTEM UTILIZING A PLURALITY OF AIR INTERFACE STANDARDS AND METHOD EMPLOYING SAME

BACKGROUND OF THE PRESENT INVENTION

1. Field of the Invention

The present invention relates to mobile radio communications systems employing orbiting satellites or relay stations, particularly, to a communications system and method for facilitating satellite communications for users of terrestrial mobile telephony systems employing a variety of interface standards, more particularly, to a communications system and method where the satellite uses at least one air interface standard which is closely related to at least one of the terrestrial interface standards.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

One area of current growth in mobile telephony is in mobile satellite systems where a mobile user's signal is relayed by an orbiting satellite, e.g., in geostationary orbit, to another user, as will be explained in more detail hereinafter. Examples of global satellite systems currently under development are Iridium, Globalstar and ICO Global Communications, Ltd. Examples of regional satellite systems also under development include the Association of SouthEast Asian Nations' (ASEAN) Cellular Satellite (ACeS) system, APMT, Thuraya, EAST and several others. At present, the prevailing view in the design of these satellite systems is to use air interface standards which are proprietary to each system and are thus not compatible with other standards.

In view of the aforedescribed exponential growth of the mobile telephony business, particularly in view of the numerous existing and emerging terrestrial cellular and Personal Communications Services (PCS) standards throughout the world, e.g., the Global System for Mobile (GSM) communications, the Digital Advanced Mobile Phone System (D-AMPS), Pacific Digital Cellular (PDC) and Code Division Multiple Access (CDMA) among others, the proprietary standard approach for satellite telecommunications systems is clearly a doubtful course to take in future development.

Applicant is a co-author of an article entitled "Dual-Mode Cellular/Satellite Hand-Held Phone Technology", in Wescon 96 Conference Record, pages 206–222, Oct. 22–24, 1996, in which he demonstrated that a satellite air interface that is modeled closely on, i.e., is a derivative of, an existing terrestrial or PCS standard, e.g., GSM, achieves significant technological and financial synergies. For example, in a satellite system using dual-mode radiotelephones, e.g., having a first terrestrially-based mode, e.g., GSM, and a second satellite-based mode, e.g., ACeS, which is patterned after GSM, circuitry reuse within the dual-mode radiotelephones and the satellite system infrastructure permits technological synergies between the ground-based satellite system equipment and corresponding GSM networks, as well as financial synergies for customers, i.e., a dual-mode radiotelephone having attractive cost, size and weight considerations.

It is, accordingly, an object of the present invention to provide a satellite system, including satellite transponder and gateway apparatus, that utilizes the technology and standards of one or more terrestrially-based cellular systems.

It is a more particular object of the present invention to utilize at least one air interface standard in the satellite that is derived from at least one of the terrestrially-based air interface standards used in customers' mobile terminals.

SUMMARY OF THE INVENTION

The present invention is directed to a satellite system and method for facilitating communications of mobile terminal users operating in a satellite-based communications mode. In particular, the present invention is directed to a satellite system employing at least one air interface standard modeled after at least one terrestrially-based air interface standard, thereby achieving both technological and financial advantages.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
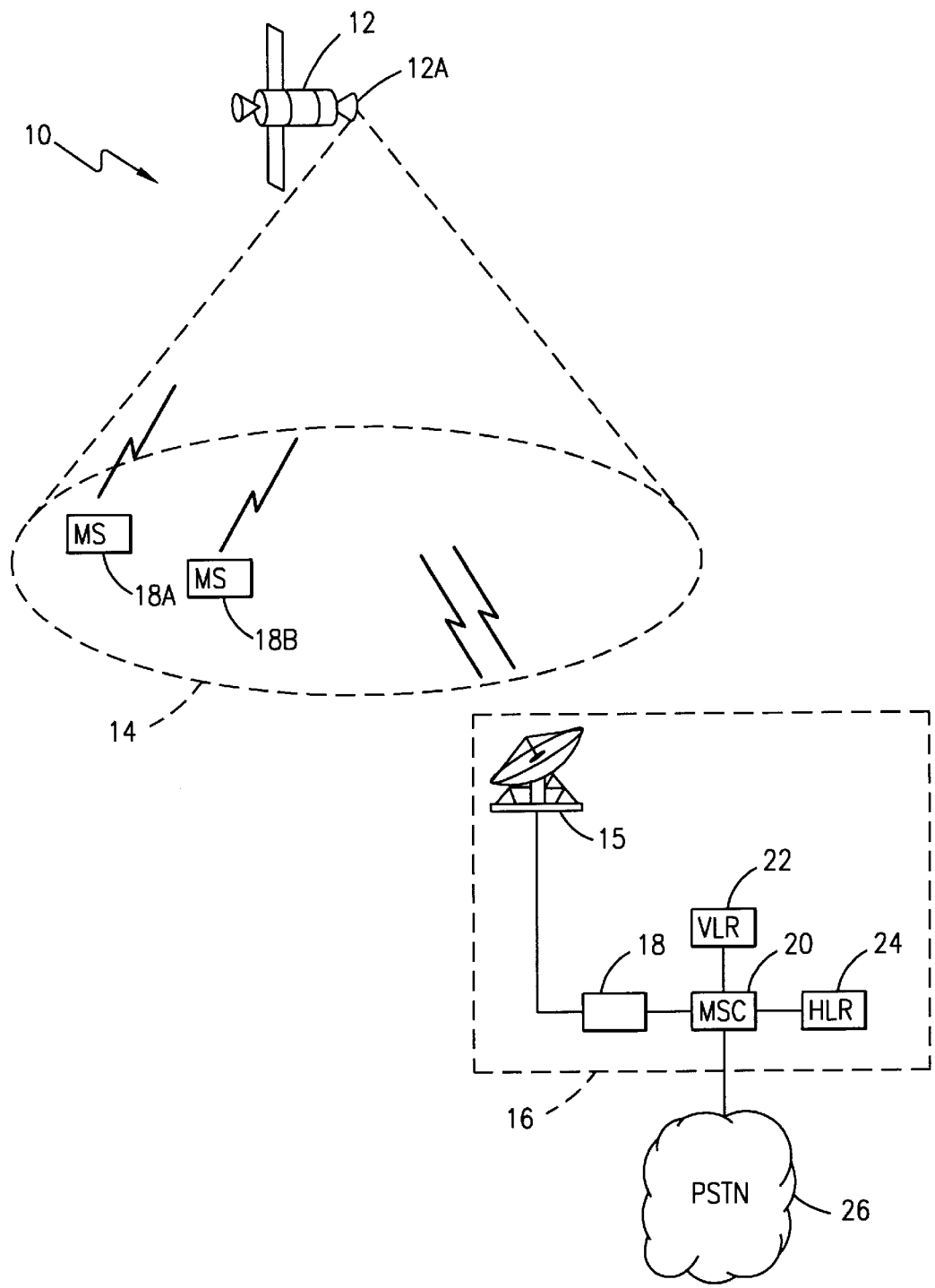
FIG. 1 is a block diagram of a mobile satellite communication system which utilizes the improved communications system and method of the present invention.

With reference now to FIG. 1 of the drawings there is illustrated a block diagram of a satellite communications system 10 employing the technology of the present invention, such as the ACeS system discussed hereinbefore. An orbiting satellite 12, such as in geostationary orbit above a given area, casts at least one satellite antenna spot beam 14 about that area. It should be understood that, as in ACeS, a number of contiguous spot beams 14 may span a much larger area, i.e., forming a satellite footprint servicing much of Asia. The satellite 12 is in communication with at least one land-earth or ground station (LES) 16, also serving as a satellite communications gateway, as well as numerous portable mobile terminals 18, of which mobile terminals 18A and 18B are illustrated. As is understood in the art, the mobile terminals 18 are serviced by an antenna beam from an antenna 12A on the satellite 12, providing high gain in the direction of the aforementioned mobile terminals 18. The LES 16 communicates with the satellite 12 using, for example, C-band or Ka-band feeder-link frequencies, while the satellite 12 communicates with the mobile terminals 18 using, for example, L-band mobile-link frequencies.

Figure 2:
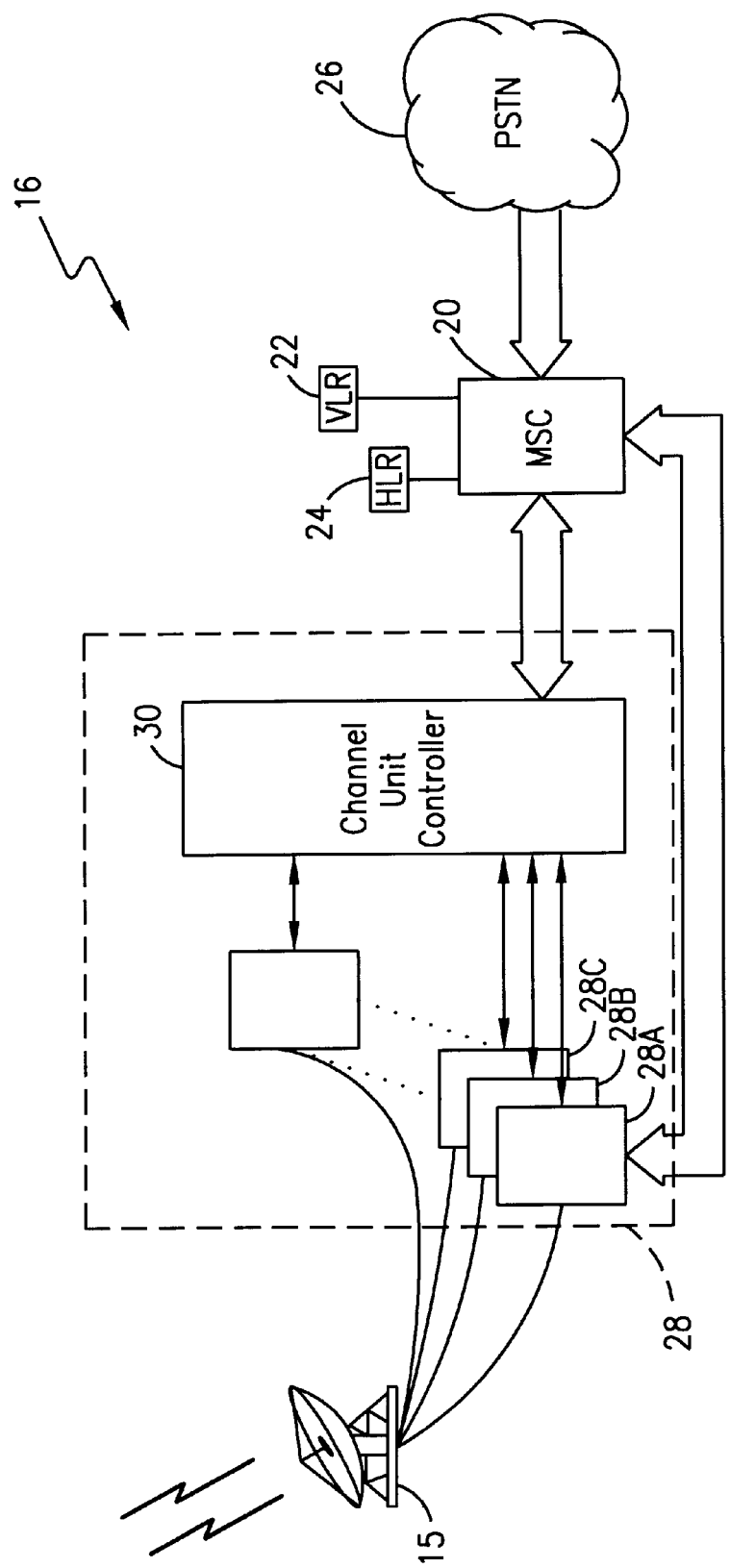
FIG. 2 is a block diagram of a terrestrially-based portion of the system shown in FIG. 1.

An LES antenna system 15 is connected to a channelizer 28, discussed further in connection with FIG. 2, which is connected to a mobile subscriber switching center (MSC) 20. Along with a visitor location register (VLR) 22 and home location register (HCR) 24, the MSC 20 performs all the typical functions of call establishment, termination, authentication, encryption, roaming and interconnection with a Public Switching Telephone Network (PSTN) 26. It should be understood that the LES 16 may also function as a cellular base station to mediate cellular, terrestrially-based calls.

With particular reference now to FIG. 2, the LES 16, via the feeder link antenna 15, receives from and transmits signals to the satellite 12. The signals received from and transmitted to the aforementioned satellite 12 are processed by the aforementioned channelizer 28 within which are a number of discrete channel units 28A, 28B, etc., forming a channel unit bank, each unit being in communication with a channel unit controller 30, which is also within the channelizer 28.

As is understood in the art, the channel unit bank in the channelizer 28 serves to demodulate the received signals (from satellite 12) and modulate the transmitted signals (going to the satellite 12), as well as perform various other receiver/transmitter functions, such as deinterleaving/ interleaving, error detection and correction, error correction encoding, voice decompression/compression and additional functions. The channel unit controller allocates radio resources to each active channel unit in channelizer 28, i.e., carrier frequency, time slot number, type of circuit supported (voice, facsimile, data, etc.), and, depending upon the implementation, may also provide information to the channel units regarding timing and frequency corrections, transmitted power level settings, etc., as is understood to those skilled in this art.

Within the channelizer 28, particularly, within one or more of the channel units 28A, etc., a plurality of air interface standards may be stored within respective sets of the channel units. In this manner a number of different air interface standards may be enabled allowing the satellite system to simultaneously operate in a variety of communications modes, e.g., in a mode adapted from GSM such as ACeS and other modes such as Globalstar, adapted from terrestrial CDMA, etc. Other satellite air interface standards, associated with or patterned after other known cellular or terrestrially-based transmission standards, may also be stored within a respective channel unit set. In this manner, one or more satellite air interfaces, each modeled after or derivative of an existing terrestrial cellular or PCS standard, may be employed by the system 10, allowing a plurality of different types (classes) of dual-mode communications and dual-mode (cellular/satellite) mobile terminals 28 to interoperate with the mobile satellite system 10. A link 32 between the MSC 20 and channelizer 28 allows the MSC 20 in conjunction with the channel unit controller 30 to enable satellite air interfaces of the channelizer 28.

Figure 3:
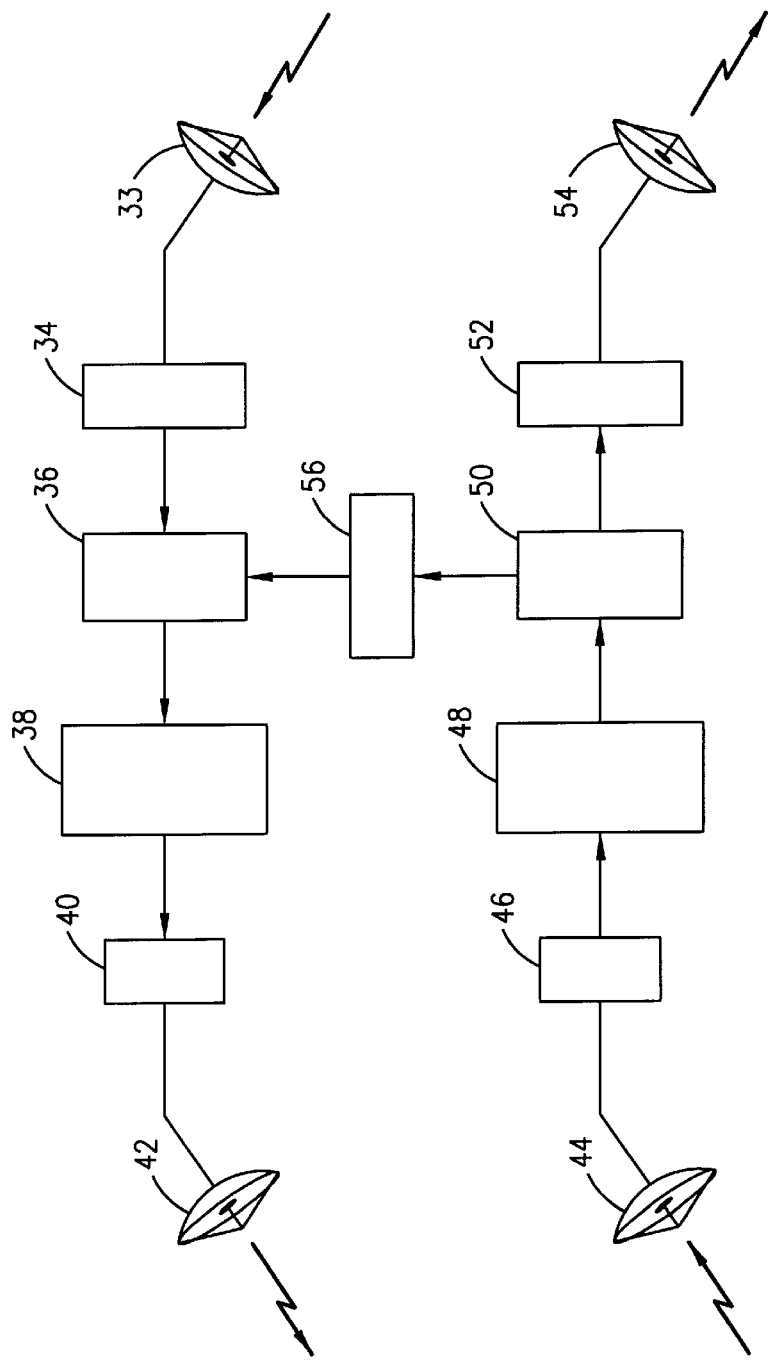
FIG. 3 is a block diagram of various payload components within the satellite shown in FIG. 1.

With reference now to FIG. 3, there is shown a block diagram illustrating various components within the satellite 12 of the present invention. In particular, FIG. 3 illustrates one embodiment of the payload architecture of satellite 12, which may be described as a non-processing, bent pipe payload architecture configuration. The terms "non-processing" and "bent pipe", as used herein, describe a satellite payroll architecture that does not subject the signals it processes to demodulation and remodulation, e.g., the signals are not regenerated. As shown in the figure, signals from the gateway LES 16 are received by a forward feeder link antenna 33 (at C-band frequencies) and passed through a forward link channelizer 34 which separates the composite received signal into its individual carrier components.

The channelized carrier signals are then forwarded to a router 36 and a beam forming network 38. Residing within the network 38 are respective subsets of complex-valued coefficients which deterministically modify the amplitude and phase of the respective carrier(s) routed therethrough. The network 38 then generates a plurality of signal replicas, each differing from the others by a complex weight (the number of signal replicas being equal to the number of complex-valued coefficients in the subset). The plurality of signal replicas thereby generated is then used to excite a predetermined subset of antenna feed elements 40 of a mobile forward link antenna 42 (at "L-band frequencies), placing the carrier(s) within the desired, i.e., predetermined at the gateway LES 16, satellite spot beam 14.

On the return link from the mobile terminals 18, a satellite mobile link antenna 44 and feed elements 46 intercept the plurality of signals being transmitted by the mobile terminals 18 (at L-band frequencies). The intercepted signals are then filtered (in order to reject out-of-band noise and interference) and amplified, both steps being omitted from FIG. 3 for simplicity. The modified signals are then sent to a beam former 48. It should be understood that the beam former 48, being associated with the return link signals, preferably forms beam contours that are congruent with the contours of the forward link beams.

In a manner inversely analogous with the aforedescribed forward link beam forming process, a return link beam is formed by taking the signal outputs of a predetermined subset of receive antenna feed elements 46, weighing each signal output of the receive antenna feed elements 46 by a complex weight, and then summing together all of the weighted contributions. The resulting composite signal from the beam former 48, representing the total signal substantially coming from within the formed receive beam contour, is then passed through a return link channelizer 50 for spectral (carrier) decomposition.

Once the carrier content of the receive beam signal has been identified (by the return link channelizer 50), the individual carriers are passed through a return link router 52, mapped onto the return link feeder link spectrum, and transmitted through a return link antenna 54 (at C-band frequencies) for transport to the gateway LES 16 for further processing (demodulation and decoding of information).

As further illustrated in FIG. 3, the return link channelizer 50 of the satellite 12 payload architecture may also include a mechanism for identifying whether certain carriers are intended for mobile terminal to mobile terminal communications, e.g., between the mobile terminals 18A and 18B. For such intra-system communications, the signals are routed via a buffer 56 to the forward link router 36 for retransmission within the appropriate forward link spot beam. Buffer 56 is primarily used for time alignment (and possibly rate-conversion purposes), as noted in U.S. patent application Ser. No. 08/581,110, filed Dec. 29, 1995 entitled "Time Compressing Transponder" to Paul W. Dent, and assigned to the assignee of the present invention, the disclosure of which is hereby incorporated by reference herein.

As discussed above, the exemplary satellite system 10 payload architecture, as shown in FIG. 3, supports a plurality of satellite air interface standards (waveforms), provided that the specified channelization functions are designed to accommodate the potentially different carrier bandwidths that may be associated with the plurality of satellite air interface waveforms. Accordingly, the specified functions, described in connection with channelizers 34 and 50 of FIG. 3, that perform channelization must have reconfigurable channelization bandwidths that can be set in accordance with the carrier bandwidths (carrier separators) used in the satellite system 10. Since a channelizer, e.g., channelizer 34 or 50, is in essence a filter bank that can be advantageously implemented using digital (discrete time) techniques, changing channelization bandwidth may be accomplished, for example, by altering the Fourier Series coefficients representing the frequency characteristics (frequency response) of the channelizer, as is understood in the art. It should also be understood that the reconfiguration of these coefficients may even be done remotely after the launch of the satellite 12 via telemetry commands.

One mechanism to avoid the need for a reconfigurable channelizer, however, is to design one with a wide-enough channelization bandwidth that can accommodate the set of all waveforms (in multiples of carriers) planned for use with a given satellite system, e.g., system 10. For example, if two types of waveforms are to be used with the satellite system 10, one requiring a channelization bandwidth of about 1.25 MHZ and the other requiring a channelization bandwidth of about 200 KHz, then a satellite payload channelizer providing channelization at a single frequency increment of 1.25 MHZ may be used. Such a channelizer would separate each 1.25 MHZ carrier (which would then be routed to the intended spot beam), and relative to the 200 KHZ carrier signals, groupings of 6 at a time would be performed by the channelizer, with each such grouping then routed to a particular one of the plurality of system spot beams 14.

It should, therefore, be understood that the combination of satellite system 10 payload (transponder) and gateway LES 16 architecture described hereinbefore advantageously enables a plurality of different types (classes) of dual-mode (cellular/satellite) mobile terminals 18 to interoperate within the mobile satellite system 10 and associated cellular systems. According to the present invention, each different type (class) of said dual-mode (cellular/satellite) mobile terminals is designed to address terrestrial communications via at least one cellular and/or PCS standard, while also being designed to address satellite communications via the aforementioned mobile satellite system 10 payload/transponder and the gateway LES 16 architecture using a satellite air interface that is closely related to/is a derivative of said cellular or PCS Standard. Furthermore, the satellite air interface is preferably a synergistic derivative of the terrestrial cellular and/or PCS standard. A result of the combination is a plurality of dual-mode (cellular/satellite) mobile terminal classes, each with at least one terrestrial and one satellite mode that are closely related to (synergistic derivatives of) each other, thereby affording significant hardware and software synergies between the modes as previously noted.

The synergy or close relationship between the two nodes is accomplished through a correspondence of various technical parameters between the two interfaces, including channel bit rate, carrier spacing, frame format, multiple access methods, signal band width, modulation, inband/out-of-band signaling channels, layer 2, 3, etc. protocols, and other such parameters.

An example of a preferred satellite system 10, where the satellite air interface is a derivative of an existing cellular standard, is ACeS. In ACES, a dual-mode mobile terminal 18 can operate in either the GSM (cellular) or ACeS (satellite) mode. The ACeS system air interface is substantially an adaptation of the GSM specification. Applicant's article discussed hereinabove contains a more detailed description of the relationship of ACeS to GSM.

The previous descriptions relate to preferred embodiments for implementing the invention, and the scope of the invention should not necessarily be limited by this description. The scope of the present invention is instead defined by the following claims.

What is claimed is:

1. In a satellite communications system having at least one satellite, at least one earth station, and a multiplicity of mobile terminals, said mobile terminals being at least dual mode, a first of said modes being a terrestrially-based mode and the second of said modes being a satellite-based mode, circuitry within said satellite communication system for supporting communication between said satellite, said earth station and said mobile terminals, said circuitry comprising:

a first air interface between a first plurality of said mobile terminals and at least one first cellular base station, said first air interface operable within said first plurality of mobile terminals when said first plurality of mobile terminals operate in said terrestrially-based mode;

a second air interface between said first plurality of mobile terminals and said at least one satellite, said second air interface operable within said first plurality of mobile terminals when said first plurality of mobile terminals operate in said satellite-based mode, said second air interface having a correspondence with said first air interface, said first and second air interfaces constituting a first communication class for said first plurality of said mobile terminals;

a third air interface between a second plurality of said mobile terminals and at least one second cellular base station, said third air interface operable within said second plurality of mobile terminals when said second plurality of mobile terminals operate in said terrestrially-based mode; and a fourth air interface between said second plurality of mobile terminals and said at least one satellite, said fourth interface operable within said second plurality of mobile terminals when said second plurality of mobile terminals operate in said satellite-based mode, said fourth air interface having a correspondence with said third air interface, said third and fourth air interfaces constituting a second class for said second plurality of mobile terminals.

2. The satellite communication circuitry according to claim 1, wherein said first air interface is according to a terrestrial GSM protocol, said first plurality of mobile terminals being operable in a terrestrial GSM mode.

3. The satellite communication circuitry according to claim 2, wherein said second air interface is according to a satellite ACeS protocol, said first plurality of mobile terminals being operable in an ACeS satellite mode.

4. The satellite communications circuitry according to claim 1, wherein said first air interface is according to a terrestrial CDMA protocol, said first plurality of mobile terminals being operable in a terrestrial CDMA mode.

5. The satellite communications circuitry according to claim 1, wherein said first air interface is according to a terrestrial TDMA protocol, said first plurality of mobile terminals being operable in a terrestrial TDMA mode.

6. The satellite communication circuitry according to claim 1, wherein said first communication class comprises GSM and ACeS, wherein GSM is said first air interface and ACeS is said second air interface.

7. The satellite communication circuitry according to claim 1, wherein said second air interface of said first communication class is stored within a plurality of channel units of a channel unit bank, a channel unit controller governing communications between said bank and said first plurality of mobile terminals within said first communication class.

8. The satellite communications circuitry according to claim 4, wherein said second air interface is substantially according to a satellite CDMA protocol, said first plurality of mobile terminals being operable in a satellite CDMA mode.

9. The satellite communications circuitry according to claim 5, wherein said second air interface is substantially according to a terrestrial DMA protocol, said first plurality of mobile terminals being operable in a satellite TDMA mode.

10. The satellite communications circuitry according to claim 2, wherein said third air interface is according to a terrestrial CDMA protocol, said first plurality of mobile terminals being dually operable in said terrestrial GSM mode and a terrestrial CDMA mode.

11. The satellite communications circuitry according to claim 2, wherein said third air interface is according to a terrestrial TDMA protocol, said first plurality of mobile terminals being dually operable in said terrestrial GSM mode and a terrestrial TDMA mode.

12. The satellite communications circuitry according to claim 6, wherein said second communication class comprises a CDMA class, wherein said third air interface is according to a terrestrial CDMA protocol, and said fourth air interface is substantially according to a satellite CDMA protocol, said first plurality of mobile terminals being operable in a satellite GSM mode and a satellite CDMA mode.

13. The satellite communications circuitry according to claim 1, wherein in said first communication class said first air interface is according to a terrestrial CDMA protocol and said second air interface is substantially according to a satellite CDMA protocol, and wherein in said second communication class said third air interface is according to a terrestrial TDMA protocol and said fourth air interface is substantially according to a satellite TDMA protocol, said first plurality of mobile terminals being dually operable in a satellite CDMA mode and a satellite TDMA mode.

14. The satellite communications circuitry according to claim 6, wherein said second communication class comprises a TDMA class wherein said third air interface is according to a terrestrial TDMA protocol, and said fourth air interface is substantially according to a satellite TDMA protocol, said first plurality of mobile terminals being operable in a satellite GSM mode and a satellite TDMA mode.

15. The satellite communications circuitry according to claim 2, wherein said third air interface is according to a terrestrial CDMA protocol, said second plurality of mobile terminals being operable in a terrestrial CDMA mode.

16. The satellite communications circuitry according to claim 2, wherein said third air interface is according to a terrestrial TDMA protocol, said second plurality of mobile terminals being operable in a terrestrial TDMA mode.

17. The satellite communications circuitry according to claim 4, wherein said second air interface is a satellite CDMA air interface substantially according to said terrestrial CDMA protocol, said first plurality of mobile terminals being operable in a satellite CDMA mode.

18. The satellite communications circuitry according to claim 5, wherein said second air interface is a satellite TDMA air interface substantially according to a terrestrial TDMA protocol, said first plurality of mobile terminals being operable in a satellite TDMA mode.

19. The satellite communications circuitry according to claim 6, wherein said third air interface is according to a terrestrial CDMA protocol, and said fourth air interface is a satellite CDMA air interface substantially according to said terrestrial CDMA protocol.

20. The satellite communications circuitry according to claim 6, wherein said second communication class comprises a TDMA class, wherein said third air interface is according to a terrestrial TDMA protocol, and said fourth air interface is a satellite TDMA air interface substantially according to said terrestrial TDMA protocol.

21. The satellite communications circuitry according to claim 7, wherein said fourth air interface of said second communication class is stored within said plurality of channel units of said channel unit bank, said channel unit controller governing communications between said bank and said second plurality of mobile terminals within said second communication class.

22. The satellite communications circuitry according to claim 7, wherein said fourth air interface of said second communication class is stored within a plurality of other channel units of a second channel unit bank, a second channel unit controller governing communications between said second channel unit bank and said second plurality of mobile terminals within said second communication class.

23. The satellite communications circuitry according to claim 1, wherein in said first communication class said first air interface is according to a terrestrial CDMA protocol and said second air interface is a satellite air interface substantially according to said terrestrial CDMA protocol, and wherein in said second communication class said third air interface is according to a terrestrial TDMA protocol and said fourth air interface is a satellite air interface substantially according to said terrestrial TDMA protocol.

24. A satellite transponder in a satellite communications system, said system including at least one earth station and a multiplicity of mobile terminals, a plurality of said mobile terminals being at least dual mode, a first of said modes being a terrestrially-based mode and the second of said modes being a satellite-based mode, circuitry within said satellite transponder for supporting communication between said satellite transponder, said earth station and said mobile terminals, said circuitry comprising:

a first satellite air interface between a first plurality of said mobile terminals and said satellite transponder, said first satellite air interface operable within said first plurality of mobile terminals when operating in said satellite-based mode, said first satellite air interface having a correspondence with a first terrestrial air interface utilized by said first plurality of mobile terminals when operating in said terrestrially-based mode, said first satellite and first terrestrial air interfaces constituting a first communication class of said first plurality of said mobile terminals; and a second satellite air interface between a second plurality of mobile terminals and said satellite transponder, said second satellite air interface operable within said second plurality of mobile terminals when operating in said satellite-based mode, said second satellite air interface having a correspondence with a second terrestrial air interface utilized by said second plurality of mobile terminals when operating in said terrestrially-based mode, said second satellite and second terrestrial air interfaces constituting a second communication class of said second plurality of said mobile terminals.

25. The satellite transponder according to claim 24, wherein said first terrestrial air interface is according to a terrestrial GSM protocol, said first plurality of mobile terminals being operable in a terrestrial GSM mode.

26. The satellite transponder according to claim 24, wherein said first satellite air interface is according to a satellite ACeS protocol, said first plurality of mobile terminals also being operable in a satellite ACeS mode.

27. The satellite transponder according to claim 24, wherein said first communication class comprises GSM and ACeS, wherein ACeS is said first satellite air interface and GSM is said first terrestrial air interface.

28. The satellite transponder according to claim 24, wherein said first satellite air interface is stored within a plurality of channel units of a channel unit bank, a channel unit controller governing communications between said bank and said first plurality of mobile terminals within said first communication class.

29. The satellite transponder according to claim 24, wherein in said first communication class said first terrestrial air interface is according to a terrestrial CDMA protocol and said first satellite air interface is substantially according to a satellite CDMA protocol, and wherein in said second communication class said second terrestrial air interface is according to a terrestrial TDMA protocol and said second satellite air interface is substantially according to a satellite TDMA protocol, said first plurality of mobile terminals being dually operable through said satellite transponder in a satellite CDMA mode and a satellite TDMA mode.

30. The satellite transponder according to claim 24, wherein said first satellite air interface is according to a terrestrial GSM protocol, said first plurality of mobile terminals being operable in a terrestrial GSM mode and a satellite GSM mode.

31. The satellite transponder according to claim 25, wherein said second satellite air interface is a satellite air interface substantially according to a terrestrial CDMA protocol, said second plurality of mobile terminals being operable in a terrestrial CDMA mode and a satellite CDMA mode.

32. The satellite transponder according to claim 25, wherein said second satellite air interface is according to a satellite CDMA protocol, said first plurality of mobile terminals being dually operable through said satellite transponder in a satellite GSM mode and a satellite CDMA mode.

33. The satellite transponder according to claim 25, wherein said second satellite air interface is according to a satellite TDMA protocol, said first plurality of mobile terminals being dually operable through said satellite transponder in a satellite GSM mode and a satellite TDMA mode.

34. The satellite transponder according to claim 27, wherein said second communication class comprises a CDMA class, wherein said second terrestrial air interface is according to a terrestrial CDMA protocol, and said second satellite air interface is substantially according to a satellite CDMA protocol, said first plurality of mobile terminals being operable through said satellite transponder in a satellite GSM mode and a satellite CDMA mode.

35. The satellite transponder according to claim 27 wherein said second communication class comprises a TDMA class, wherein said second terrestrial air interface is according to a terrestrial TDMA protocol, and said second satellite air interface is substantially according to a satellite TDMA protocol, said first plurality of mobile terminals being operable through said satellite transponder in a satellite GSM mode and a satellite TDMA mode.

36. The satellite transponder according to claim 28, wherein said second satellite air interface is stored within said plurality of channel units of said channel unit bank.

37. The satellite transponder according to claim 25, wherein said second satellite air interface is a satellite air interface substantially according to a terrestrial TDMA protocol, said second plurality of mobile terminals being operable in a terrestrial TDMA mode and a satellite TDMA mode.

38. The satellite transponder according to claim 27, wherein said second communication class comprises a CDMA class, wherein said second terrestrial air interface is according to a terrestrial CDMA protocol, and said second satellite air interface is a satellite air interface substantially according to said terrestrial CDMA protocol, said first plurality of mobile terminals being operable through said satellite transponder in a satellite GSM mode and said second plurality of mobile terminals being operable through said satellite transponder in a satellite CDMA mode.

39. The satellite transponder according to claim 27, wherein said second communication class comprises a TDMA class, wherein said second terrestrial air interface is according to a terrestrial TDMA protocol, and said second satellite air interface is substantially according to said terrestrial TDMA protocol, said first plurality of mobile terminals being operable through said satellite transponder in a satellite GSM mode and said second plurality of mobile terminals being operable through said satellite transponder in a satellite TDMA mode.

40. A satellite transponder according to claim 24, wherein in said first communication class said first terrestrial air interface is according to a terrestrial CDMA protocol and said first satellite air interface is a satellite air interface substantially according to said terrestrial CDMA protocol, and wherein in said second communication class said second terrestrial air interface is according to a terrestrial TDMA protocol and said second satellite air interface is a satellite air interface substantially according to a satellite TDMA protocol, said first plurality of mobile terminals being operable through said satellite transponder in a satellite CDMA mode and said second plurality of mobile terminals being operable through said satellite transponder in a satellite TDMA mode.

41. A method for supporting calls for a plurality of mobile terminals within a satellite communications system having at least one satellite and at least one earth station, a first and a second of said mobile terminals operating in respective dual modes, a first of said modes being a terrestrially-based mode and the second of said modes being a satellite-based mode, said method comprising the steps of:

transmitting first signals from said first mobile terminal to said satellite in a first satellite-based mode, said first satellite-based mode having a correspondence with a first terrestrially-based mode operable within said first mobile terminal, said first terrestrially-based and first satellite-based modes of said first mobile terminal constituting a first communication class; and transmitting second signals from said second mobile terminal to said satellite in a second satellite-based mode, said second satellite-based mode having a correspondence with a second terrestrially-based mode operable within said second mobile terminal, said second terrestrially-based and second satellite-based modes of said second mobile terminal constituting a second communication class.

42. The method according to claim 41, wherein said first satellite-based mode of said first mobile terminal is according to a satellite ACeS protocol, said first mobile terminal being operable in a satellite ACeS mode.

43. The method according to claim 41, wherein said first terrestrially-based mode of said first mobile terminal is according to a terrestrial GSM protocol, said first mobile terminal being operable in a terrestrial GSM mode.

44. The method according to claim 41, wherein said signal transmission from said first mobile terminal to said satellite is in said second mode, said first and second mobile terminals being operable in at least two second modes.

45. The method according to claim 41, wherein said first terrestrially-based mode of said first mobile terminal is according to a terrestrial CDMA protocol, and wherein said second terrestrially-based mode of said second mobile terminal is according to a terrestrial TDMA protocol.

46. The method according to claim 41, wherein said first satellite-based mode of said first mobile terminal is according to a satellite CDMA protocol, and wherein said second satellite-based mode of said second mobile terminal is according to a satellite TDMA protocol.

47. The method according to claim 42, wherein said second satellite-based mode of said second mobile terminal is according to a satellite TDMA protocol.

48. The method according to claim 42, wherein said second satellite-based mode of said second mobile terminal is according to a satellite CDMA protocol.

49. The method according to claim 43, wherein said second terrestrially-based mode of said second mobile terminal is according to a terrestrial CDMA protocol.

50. The method according to claim 43, wherein said second terrestrially-based mode of said second mobile terminal is according to a terrestrial TDMA protocol.

51. The method according to claim 41, wherein said first mobile terminal is operable in a satellite GSM mode and a satellite CDMA mode.

52. The method according to claim 41, wherein said first mobile terminal is operable in a satellite CDMA mode and a satellite TDMA mode.

53. The method according to claim 44, wherein said second modes are selected from the group consisting of satellite GSM, satellite CDMA and satellite TDMA modes.

54. The method according to claim 41, wherein said first mobile terminal is operable in a terrestrial GSM mode and a satellite GSM mode.

55. The method according to claim 54, wherein said satellite GSM mode of said first mobile terminal is according to an ACeS protocol.

56. The method according to claim 54, wherein said second mobile terminal is operable in a terrestrial GSM mode and a satellite GSM mode.

57. The method according to claim 41, wherein said terrestrially-based air interface for said first mobile terminal is according to a terrestrial CDMA protocol, said first mobile terminal being operable in a terrestrial and a satellite CDMA mode.

58. The method according to claim 41, wherein said terrestrially-based air interface for said first mobile terminal is according to a terrestrial TDMA protocol, said first mobile terminal being operable in a terrestrial and a satellite TDMA mode.

59. A method for supporting calls between a plurality of mobile terminals within a satellite communications system having at least one satellite and at least one earth station, a first and a second of said mobile terminals operating in a dual mode, a first of said modes being a terrestrially-based mode and the second of said modes being a satellite-based mode, said method comprising the following steps:

transmitting signals from said first mobile terminal to said satellite, said signal transmission being in said second mode, said satellite including a transceiver therein, said transceiver employing a satellite air interface for receiving said signal transmission; and transmitting said signal transmission, received by said satellite from said first mobile terminal, from said satellite to said second mobile terminal in said second mode, said satellite air interface having a correspondence with a terrestrially-based air interface of said second mobile terminal, said terrestrially-based air interface being used by said second mobile terminal when operating in said terrestrially-based mode, wherein said first mobile terminal is operable in a satellite GSM mode and said second mobile terminal is operable in a satellite CDMA mode.

60. A method for supporting calls between a plurality of mobile terminals within a satellite communications system having at least one satellite and at least one earth station, a first and a second of said mobile terminals operating in a dual mode, a first of said modes being a terrestrially-based mode and the second of said modes being a satellite-based mode, said method comprising the following steps:

transmitting signals from said first mobile terminal to said satellite, said signal transmission being in said second mode, said satellite including a transceiver therein, said transceiver employing a satellite air interface for receiving said signal transmission; and transmitting said signal transmission, received by said satellite from said first mobile terminal, from said satellite to said second mobile terminal in said second mode, said satellite air interface having a correspondence with a terrestrially-based air interface of said second mobile terminal, said terrestrially-based air interface being used by said second mobile terminal when operating in said terrestrially-based mode, wherein said first mobile terminal is operable in a satellite CDMA mode and said second mobile terminal is operable in a satellite TDMA mode.

61. A method for supporting calls between a plurality of mobile terminals within a satellite communications system having at least one satellite and at least one earth station, a first and a second of said mobile terminals operating in a dual mode, a first of said modes being a terrestrially-based mode and the second of said modes being a satellite-based mode, said method comprising the following steps:

transmitting signals from said first mobile terminal to said satellite, said signal transmission being in said second mode, said satellite including a transceiver therein, said transceiver employing a satellite air interface for receiving said signal transmission; and transmitting said signal transmission, received by said satellite from said first mobile terminal, from said satellite to said second mobile terminal in said second mode, said satellite air interface having a correspondence with a terrestrially-based air interface of said second mobile terminal, said terrestrially-based air interface being used by said second mobile terminal when operating in said terrestrially-based mode, wherein said signal transmission from said first mobile terminal to said satellite is in said second mode, at least one of said first and second mobile terminals being operable in at least two second modes.

62. The method according to claim 61, wherein said second modes are selected from the group consisting of satellite GSM, satellite CDMA and satellite TDMA modes.

* * * * *

UNITED STATES PATENT AND TRADEMARK OFFICE
CERTIFICATE OF CORRECTION

PATENT NO. : 6,052,560
DATED : April 18, 2000
INVENTOR(S) : Peter D. Karabinis

It is certified that error appears in the above-indentified patent and that said Letters Patent is hereby corrected as shown below:

Column 7, line 23  Replace "DMA"
With --TDMA--

Signed and Sealed this

Eighth Day of May, 2001

*Attest:*

NICHOLAS P. GODICI

*Attesting Officer*  *Acting Director of the United States Patent and Trademark Office*